US006050711A

United States Patent [19]

Li

[11] Patent Number: 6,050,711

[45] Date of Patent: Apr. 18, 2000

[54] ANTIGLARE REMOTE LIGHT HEADLIGHT FOR AUTOMOBILES

[76] Inventor: Jianming Li, 22, 714/F, Jinsong, Chaoyang District, Beijing 100021, China

[21] Appl. No.: 08/776,685

[22] PCT Filed: Aug. 18, 1995

[86] PCT No.: PCT/CN95/00065

§ 371 Date: Jul. 11, 1997

§ 102(e) Date: Jul. 11, 1997

[87] PCT Pub. No.: WO96/05982

PCT Pub. Date: Feb. 29, 1996

[30] Foreign Application Priority Data

Aug. 18, 1994 [CN] China .................................. 94114942

[51] Int. Cl.[7] ........................................ B60Q 1/04

[52] U.S. Cl. .......................... 362/517; 362/518; 362/297

[58] Field of Search .................................. 362/518, 346, 362/297, 298, 516, 517, 520, 307, 308, 310

[56] References Cited

U.S. PATENT DOCUMENTS

| | | | |
|---|---|---|---|
| 4,238,817 | 12/1980 | Fratty | 362/518 |
| 4,914,747 | 4/1990 | Nino | 362/518 |
| 5,544,021 | 8/1996 | Lopez et al. | 362/518 |

*Primary Examiner*—Thomas M. Sember
*Attorney, Agent, or Firm*—Kenyon & Kenyon

[57] ABSTRACT

An antiglare remote light headlight for automobiles, comprising a light source, a reflector, a front lens and a notched reflecting surface, the notched reflecting surface is located above the light axis of the reflector and fixed on the reflector through an attaching support, the filament is located within the notched reflecting surface and behind the focus of reflector, and the front lens is placed in front of the reflector, characterized in that the location of the filament is determined on the basis of the relation between the boundary line of the glaring light area on a light test plane and the light reflecting plane so as to attain an antiglare effect.

19 Claims, 6 Drawing Sheets

ANTIGLARE REMOTE LIGHT HEADLIGHT FOR AUTOMOBILES

FIELD OF THE ART

This invention relates to a lighting lamp for powered vehicles, particularly to a headlight for automobiles, which comprises a light source, a reflector, a front lens and a built-in reflector.

BACKGROUND OF THE ART

In China Invention patent No. 91109081.9 an antiglare remote light headlight was proposed. In such a headlight, a light source is placed within a semispheric built-in reflector located above the light axis of reflector, the light source being located behind the focus of reflector. The basic constitution of such an antiglare headlight was described in that invention application with reference to China Invention Patent Application No. 86100659: with a attaching support 7, shown in FIG. 1, and in drawing 1 of above patent application, a built-in reflector 1 is fixed onto reflector 8 to make it located above the light axis 10 of reflector, a light source 2 is mounted within the built-in reflector through a light source lead wiring frame 6 and a front lens is disposed in front of the reflector 8. To prevent the incident light, emitted from the light source to the lower edge of the built-in reflector located in front of the sphere center, from yielding glaring reflective light, China Invention Patent No. 91109081.9 pointed out that the angle between the incident light, emitted from the light source to the front lower edge of the built-in reflector and lying above the normal, and the normal is smaller than the angle between the normal and the light axis of reflector. But, because the reflecting plane defined by the incident light, emitted from the light source to the lower edge of the built-in reflector located in front of the sphere center, and the normal is not certain to lie in the same reflecting plane as the light axis of reflector does, as shown in FIG. 2, in view of the light source, the sphere center of the semispheric built-in reflector and the spatial position of the light axis of reflector all defined according to the invention, the sphere center 12 is located in the horizontal plane in which the central axis of the light source 1 lies and on the edge of the light source on the notch 13 side, and the light axis 11 of reflector and the central axis of the light source are located in the same vertical plane. Apparently, the respective reflecting planes defined by the incident light and the normals passing through the sphere center are not located in the same plane as the light axis of reflector is, the incident light being emitted from the light soure points to the lower edge 21 of the built-in reflector, and these light source points being located above the lines connecting the points on the front lower edge 21 of the bulit-in reflector 4 to the sphere center, that is, above the normals. Therefore, even the relation described above, that the angle between the incident light and the normal is smaller than the angle between the normal and the light axis of reflector, has been met, it is not necessarily able to ensure that the reflective light of the incident light emitted from the light source to the front lower edge 21 of the built-in reflector, sends out horizontally or sends out upwardly, and it is still possible to yield glaring reflective light with an angle between the incident light, reflected from the front lower edge of the built-in reflector to the lower half of the reflector, and the normal to be smaller than the angle between a horizontal line, on the reflecting plane defined by this incident light and the normal and passing through the light incidence point on the reflector, and the normal.

In the antiglare remote light headlights of prior art, to prevent from yielding glaring light, the mounting position of the light source is limited to meet such a position relationship, that is, the angle between the incident light, emitted from the light source to the lower half of the reflector located under the light axis of reflector, and the normal is generally larger than the angle between the horizontal line, on the reflecting plane and passing through the light incidence point, and the normal; or is larger than the angle between the two lines: one of them connects the point, which is made by a specific horizontal line when passing through the reflecting plane defined by the incident light and the normal, and the light incidence point on the reflector; the other line is the normal. The specific horizontal line is set at the limit hight on the test plane for not yielding any glaring light. Thus, the unglaring light, which is emitted from the light source to the lower half of the reflector and the reflective light of which surpasses that emitted from the horizontal light to an E-type light interval, is not fully utilized, thereby decreasing the intensity of the light that lights up distant places, to make it difficult to better accommodate the needs of vehicles travelling at high speeds.

In such an antiglare remote light headlight of prior art, to prevent from yielding secondary reflective glaring light, it is determined that the notch height meets the relationship, that is, the angle between the incident light which is emitted from the light source located behind the sphere-center to the upper notch edge of the semispheric built-in reflector behind the sphere center and the normal is smaller than the angle between the line which connects the intersection made by the reflecting plane, defined by such incident light and the normal, with the lower edge of the built-in reflector located in front of the sphere center to the light incidence point on the sphere and the normal, that makes the light reflected back from the incident light emitted to the upper notch edge directly illuminate the space under the built-in reflector and thereby achieves the purpose of eliminating secondary glaring light. Thus, since the minimum height of the notch of the built-in reflector is restricted, the angle between the E-type light formed by emitting toward the upper half of the reflector through the notch of the built-in reflector, and the horizontal line passing through the light axis can not be smaller than a certain angle (generally larger than the E-type light pattern of 15 angle specified by chinese or europian standard, E-type light pattern is a kind of triangle light pattern which is formed by the lights illuminated above the horizontal line passing through the light axis and on the side of vertical line passing through the light axis.), the E-type light pattern which meets different test standards and is suitable to travel on various roads can not be emitted.

SUMMARY OF THE INVENTION

The object of the invention lies in avoiding above disadvantages in prior art and providing an antiglare remote light headlight which is of better antiglaring and illuminating effects by overall elimination of glaring light through more all-sidedly and more accurately limitation of the filament location and in which the remote light can emit different antiglare light patterns to meet different test standards and make the illuminating and antiglaring performance further meet the needs of vehicle travellings.

According to one aspect of the invention, an antiglare remote light headlight is provided. To overcome the drawback that the light source at the location in priot art can still yield glaring light, on the basis of that notched built-in reflector is located above the light axis of a reflector and fixed on the reflector through an attaching support, a light source is located within the built-in reflector and behind the focus of reflector, and a front lens (astigmatic glass) is in front of the reflector, it is proposed that the light source is mounted at the spatial position where the angle between the incident light, emitted from the light source to the lower edge of the portion of the built-in reflector in front of the reflector focus and located above the normal, and the normal is equal to or smaller than the angle between the two lines, one is the intersection line, which is made by the reflecting plane defined by this incident light and the normal and the horizontal plane in which the lower edge of the built-in reflector is located, and the other line is the normal passing through the light incidence point. Thus, it is ensured that the light, reflected back from the lower edge of the built-in reflector in front of the focus, either reflects again via the built-in reflector and emits from behind the focus to the lower half of the reflector, that makes the angle between the incident light and the normal on the reflector to be larger than the angle between the horizontal line passing through the light incidence point on the reflecting plane and the normal and thereby eliminates the glaring reflective light; or emits from above the light axis of reflector to the upper half of the reflector through the notch of the built-in reflector, that is, the intersection point, made by the incident light emitting to the upper half of the reflector through the notch of the built-in reflector and the virtical plane passing through the light axis of reflector, is located on or coincident with the light axis of reflector, that makes the intersection point made by the reflecting plane and the vertical line passing through the axis of the headlight testing machine on the light test plane to be lower than the horizontal line passing though the axis of the headlight testing machine and thereby makes the reflective light of the light emitting to the upper half of the reflector through the notch of the built-in reflector either reflect upwardly to become E-type light or emit from under the intersection made by the axis of the headlight testing machine and the test plane to the ground surface on the other side of the light axis, in each case there will not be glaring light.

According to another aspect of the invention, an antiglare remote light headlight is provided, its built-in reflector is located above the light axis of a reflector and fixed on the reflector through an attaching support, a light source is located within the built-in reflector and behind the focus of reflector, a front lens (astigmatic glass) is placed in front of the reflector, and its light source is mounted at the spatial position where (1) the intersection point, made by the incident light emitted from the light source to the reflector of the headlight and the vertical plane passing through the light axis of reflector, is located under the light axis of reflector; (2) the angle between the incident light, emitted from the light source to the left lower portion (while automobiles travel on the right-hand side) or the right lower portion (while automobile travel on the left-hand side) of the reflector with respect to the light axis of reflector, and the normal is generally larger than the angle between the horizontal line, passing through the light incidence point on the reflecting plane, and the normal, or is larger than the angle between the two lines: one of them connects the point, which is made by a specific horizontal line passing through the reflecting plane defined by the incident light and the normal, and the light incidence point on the reflector; the other line is the normal. The specific horizontal line (e.g., H—H horizontal line) is set at the limit hight on the test plane for not yielding any glaring light; and the angle between the incident light, emitted to the right lower portion or the right upper portion (while automobiles travel on the right-hand side) or the left lower portion or the left upper portion (while automobiles travel on the left-hand side) of the reflector with respect to the light axis of reflector, and the normal is generally larger than the angle between the two lines, one of them is the intersection line, made by the vertical plane passing through the light incidence point on the reflecting plane and parallel to the light axis of reflector and the reflecting plane, the other line is the normal, or is larger than the angle between the two lines: one of them connects the point, which is made by a specific vertical line passing through the reflecting plane defined by the incident light and the normal, and the light incidence point on the reflector; the other line is the normal. The specific vertical line (e.g., V—V vertical line) is set at the limit leftward offset position (while automobiles travel on the right-hand-side) or at the limit rightward offset position (while automobiles travel on the left-hand-side) on the test plane for not yielding any glaring light.

According to another aspect of the invention, an antiglare remotelight headlight is provided, its built-in reflector is located above the light axis of a reflector and fixed on the reflector through an attaching support, a light source is located within the built-in reflector and behind the focus of reflector, a front lens (astigmatic glass) is placed in front of the reflector, and its light source is mounted at the spatial position where (1) the intersection point, made by the incident light emitted from the light source to the reflector of the headlight and the vertical plane passing through the light axis of reflector, is located above or coincident with the light axis of reflector; (2) the angle between the incident light, emitted from the light source to the right lower portion (while automobiles travel on the right-hand side) or the left lower portion (while automobiles travel on the left-hand side) of the reflector with respect to the light axis of reflector, and the normal is generally larger than the angle between the horizontal line passing through the light incidence point on the reflecting plane and the normal, or is larger than the angle between the two lines: one of them connects the point, which is made by a specific horizontal line when passing through the reflecting plane defined by the incident light and the normal, and the light incidence point on the reflector; the other line is the normal. The specific horizontal line is set at the limit hight on the test plane for not yielding any glaring light.

According to another aspect of the invention, an antiglare remote light headlight is provided, its nothched built-in reflector is located above the light axis of a reflector and fixedly mounted on the reflector through an aching support, a light source is located within the built-in reflector and behind the focus of reflector, a front lens (astigmatic glass) is placed in front of the reflector. To make the headlight emit an E-type antiglaring light pattern which is capable of meeting different test standards, the angle of the E-type light pattern is controlled by the front lens (astigmatic glass) cooperating with the notch of a semispheric or cylindrical built-in reflector, that is, within the interval that corresponds the emision of E-type light pattern by the headlight reflector, the other angular side of the front lens is determined, by taking the horizontal line passing through the light axis as a reference side and the light axis of reflector as an apes of the angle, according to the requirements to the angle of E-type light pattern from different light test standards. The E-type light beyond this angle, sent out from the notch of the built-in reflector, is caused by the prism or lens on the front lens to refract downwardly so as to be below the side line of the E-type light pattern with a standard angle when it emits on to the light test plane. Thus the E-type light pattern that meets the international test standard is achieved so as to cause it further meet the antiglare requirment for travelling.

According to another aspect of the invention, an antiglare remote light headlight is provided, when the antiglare headlight of the invention is made to be of a half-closed type, a bulb is drsposed, a part of the surface of the bulb shell being plated with a reflecting layer and such a bulb shell serving as a built-in reflector with a notch thereon; the built-in reflector is located above the light axis of a reflector and fixed on the reflector through the bulb bayonet, a light source is located within the built-in reflector and behind the focus of reflector, and a front lens (astigmatic glass) is placed in front of the reflector; the light source is mounted at the spatial position where the angle between the incident light, emitted from the light source to the lower edge of the built-in reflector in front of the focus of reflector and located above the normal, and the normal is equal to or smaller than the angle between the intersection line, made by the reflecting plane defined by this incident light and the normal and the horizontal plane in which the lower edge of the built-in reflector is located, and the normal passing through the light incidence point. Thus it is ensured that the light, reflected back from the lower edge of the built-in reflector in front of the focus, either reflects again via the bilt-in reflector and emits from behind the focus to the lower half of the reflector, that makes the angle between the light and the normal to be larger than the angle between the hoizontal line passing through the light incidence point on the reflecting plane and the normal and thereby eliminates the glaring reflective light; or emits from above the light axis of reflector to the upper half of reflector through the notch of the built-in reflector, that is, the intersection point, made by the incident light emitting to the upper half of the reflector through the notch of the built-in reflector with the vertical plane passing through the light axis of reflector, is located above or coincident with the light axis of reflector, that makes the intersection point made by the reflecting plane and the vertical line passing through the axis of the headlight testing machine on the light test plane to be lower than the horizontal line passing through the axis of the headlight testing machine and thereby makes the reflective light of the light emitting to the upper half of the reflector through the notch of the built-in reflector to either reflect upwardly to become E-type light or emit from under the intersection made by the axis of the headlight testing machine with the test plane to the ground surface on the other side of the light axis, in each case there will not be glaring light.

According to another aspect of the invention, an antiglare remote light headlight is provided, when the antiglare headlight of the invention is made to be of a half-closed type, a bulb is disposed, a part of the surface of the bulb shell being plated with a reflecting layer and such a bulb shell serving as a built-in reflector with a notch thereon; the built-in reflector is located above the light axis of a reflector and fixed on the reflector through the bulb bayonet, a light source is located within the built-in reflector and behind the focus of reflector, and a front lens (astigmatic glass) is placed in front of the reflector; the light source is mounted at the spatial position where (1) the intersection point, made by the incident light emitted from the light source to the reflector of the headlight and the vertical plane passing through the light axis of reflector, is located under the light axis of reflector; (2) the angle between the incident light, emitted from the light source to the left lower portion (while automobiles travel on the right-hand side) or the right lower portion (while autombiles travel on the left-hand side) of the reflector with respect to the light axis of reflector, and the normal is generally larger than the angle between the horizontal line, passing through the light incidence point on the reflecting plane, and the normal, or is larger than the angle between the two lines: one of them connects the point, which is made by a specific horizontal line and the reflecting plane defined by the incident light and the normal, and the light incidence point on the reflector; the other line is the normal. The specific horizontal line (e.g., H—H horizontal line) is set at the limit hight on the test plane for not yielding any glaring light; and the angle between the incident light, emitted to the right lower portion or the right upper portion (while automobiles travel on the right-hand side) or the left lower portion or the left upper portion (while automobiles travel on the left-hand side) of the reflector with regard to the light axis of reflector, and the normal is generally larger than the angle between the intersection line, made by the vertical plane passing through the light incidence point on the reflecting plane and parallel to the light axis of reflector with the reflecting plane, and the normal, or is larger than the angle between the two lines: one of them connects the point, which is made by a specific vertical line passing through the reflecting plane and the light incidence point on the reflector; the other line is the normal. The specific vertical line (e.g., V—V vertical line is set at the limit leftward offset position (while automobiles travel on the right-hand-side) or at the limit rightward offset position (while automobiles travel on the left-hand-side) on the test plane for not yielding any glaring light.

According another aspect of the invention, an antiglare remote light headlight is provided, when the antiglare headlight of the invention is made to be of a half-closed type, a bulb is disposed, a part of the surface of the bulb shell being plated with a reflecting layer and such a bulb shell serving as a built-in reflector with a notch thereon; the built-in reflector is located above the light axis of a reflector and fixed on the reflector through the bulb bayonet, a light source is located within the built-in reflector and behind the focus of reflector, and a front lens (astigmatic glass) is placed in front of the reflector; the light source is mounted at the spatial position where (1) the intersection point, made by the incident light emitted from the light source to the reflector of the headlight with the vertical plane passing through the light axis of reflector, is located above or coincident with the light axis of reflector; (2) the angle between the incident light, emitted from the light source to the right lower portion (while automobiles travel on the right-hand side) or the left lower portion (while automobiles travel on the left-hand side) of the reflector with respect to the light axis of reflector, and the normal is generally larger than the angle between the horizontal line, passing through the light incidence point on the reflecting plane, and the normal, or is larger than the angle between the two lines: one of them connects the point, which is made by a specific horizontal line passing through the reflecting plane defined by the incident light and the normal, and the light incidence point on the reflector; the other line is the normal. The specific horizontal line (e.g., H—H horizontal line) is set at the limit hight on the test plane for not yielding any glaring light.

According to another aspect of the invention, an antiglase remote light headlight of the invention is made to be of a half-closed type, a bulb is disposed, a part of the surface of the bulb shell being plated with a reflecting layer and such a bulb shell sorving as a built-in reflector with a notch thereon; the built-in reflector is located above the light axis of the reflector and fixed on the reflector through the bulb bayonet, a light source is located within the built-in reflector and behind the focus of reflector, and a front lens (astigmatic glass) is placed in front of the reflector. To make the headlight emit an E-type antiglaring light pattern which is capable of meeting different text standards, the angle of the E-type light pattern is controlled by the front lens (astigmatic glass) cooperating with the notch of a semispheric or cylindrical built-in reflector, that is, within the interval that corresponds the emission of E-type light pattern by headlight reflector, the other angular side of the front lens is determined, by taking the horizontal line passing through the light axis as a reference side and the light axis of reflector as an apex of the angle, according to the requirements to the angle of E-type light pattern from different light test standards. The E-type light beyond this angle, sent out from the notch of the bulit-in reflector, is caused by the prison or lens on the front lens to refract downwardly so as to be below the side line of the E-type light pattern with a standard angle when it emits onto the light test plane. Thus the E-type light pattern that meets the international test standard, is achieved so as to make it further meet the antiglare requiremant for travelling.

To prevent the reflective light, of the light emitted from the light source to the portion of semispheric built-in reflector behind the sphere center, from emitting to the lower edge in front of the sphere center to yield the secondary reflective glaring light emitting from before the focus to the lower half of the reflector, the upper notch edge of the built-in reflector is disposed at the level where the angle between the incident light, emitted from the light source to the upper notch edge, and the normal is smaller than the angle between the line which connects the intersection point, made of the reflecting plane defined by this incident light and the normal with the lower edge of the built-in reflector, to the light incidence point on the reflecting plane and the normal, that makes the light, reflected back again from the incident light emitting from the light source to the upper notch edge, emit directly to the space under the built-in reflector and thus eliminates the secondary reflective glaring light.

To prevent the E-type light of the headlight from glaring, on the headlight a circuit for controlling the light intensity is provided. For example, on the light-weakenning circuit of the headlight a resistance is used for reducing the filament power to weaken the light intensity of the remote light filament to accommodate this particular situation.

To prevent the irregular glaring light from being reflected due to the deformation at the apex of the rotational parabolic reflector and to prevent the light, emitted directly from the light source to the apex of reflector or emitted to the apex of reflector after reflecting back via the built-in reflector, from reflecting again to become glaring light, at the apex of reflector there is a dark area without being plated with a reflecting layer, the projection of this dark area in the direction of the light axis of reflector is circular in shape.

Since the present invention, comparing to prior art, provides the new location of the light source to make the location of the light source of the antiglare headlight to be more accurate and the antiglare range of the headlight more all-sided, that will ensure the remote light antiglaring effectiveness and enhance the remote light illuminating intensity. Also since the inventive headlight offers a new device for controlling the E-type antiglaring light pattern of the headlight to make it be capable of emitting different E-type antiglaring light pattens in accordance with different international light test standards for headlights, its illuminating and antiglaring capacities are more suitable for the requirement of travelling at night.

DESCRIPTION OF ACCOMPANYING DRAWINGS

FIG. 3–FIG. 9 are the diagrammatic sketches of the spatial mounting positions of the components of an antiglare remote light headlight in the present invention, in which:

FIG. 3 is a right view diagrammatic sketch of an antiglare remote light headlight provided with a semispheric built-in reflector;

FIG. 4 is a diagrammatic sketch in K direction of FIG. 3;

FIG. 5 is a diagrammatic sketch of the reflection relationship of the light sources illuminating the notch upper edge and the semisphere lower edge;

FIG. 6 is a right view diagrammatic sketch of an antiglare remote light headlight provided with a cylindrical built-in reflector;

FIG. 7 is a diagrammatic sketch in K direction of FIG. 6;

FIG. 8 is a diagrammatic sketch of the intersection of the reflecting plane with V—V vertical line and H—H horizontal line on the light test plane;

FIG. 9 is a diagrammatic sketch of the light distribution direction of the front lens for cooperating with the notch of the built-in reflector to control the angle of the E-type antiglare light pattern.

OPTIMUM IMPLEMENTATION OF THE PRESENT INVENTION

Concrete details of an antiglare headlight proposed according to the present invention will now be described in detail in combination with accompanying drawings as follows.

Figure 1:
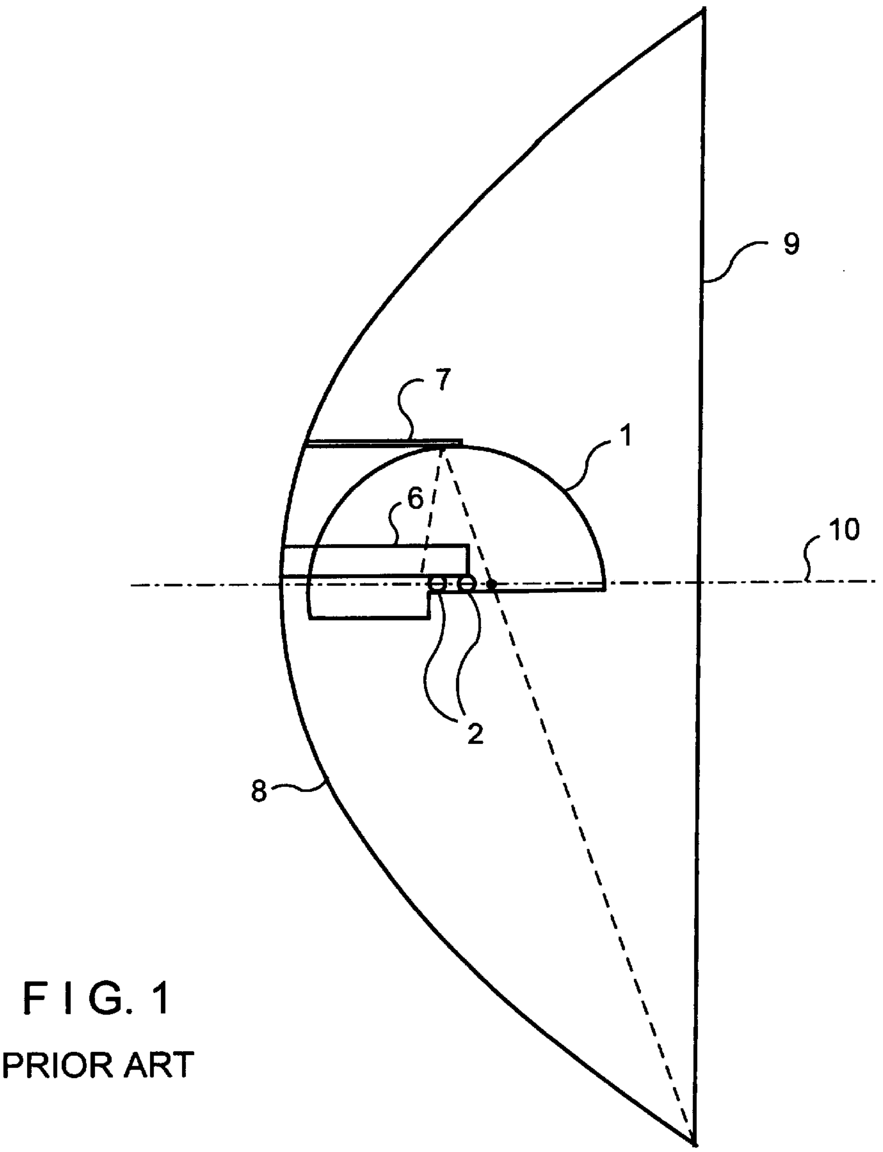
FIG. 1 PRIOR ART
FIG. 1 is a diagrammatic sketch of the assembling of the light source, the semispheric built-in reflector, the front lens and the reflector of an antiglare headlight in pior art.
Figure 2:
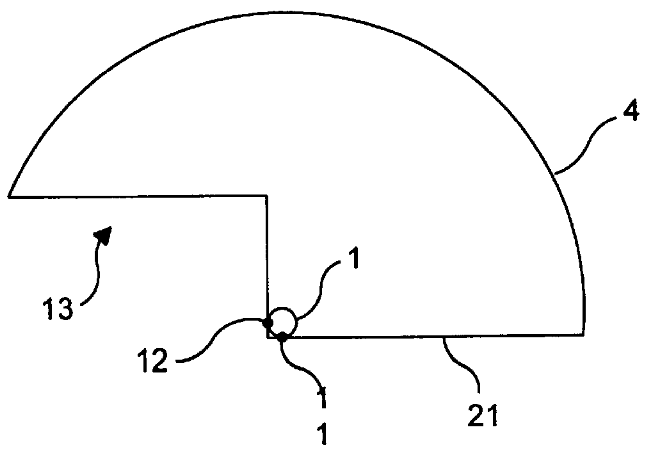
FIG. 2 PRIOR ART
FIG. 2 is a diagrammatic sketch of the spatial mounting positions of the light source, the semispheric built-in reflector, the front lens and the reflector of an antiglare headlight in prior art.
Figure 3:
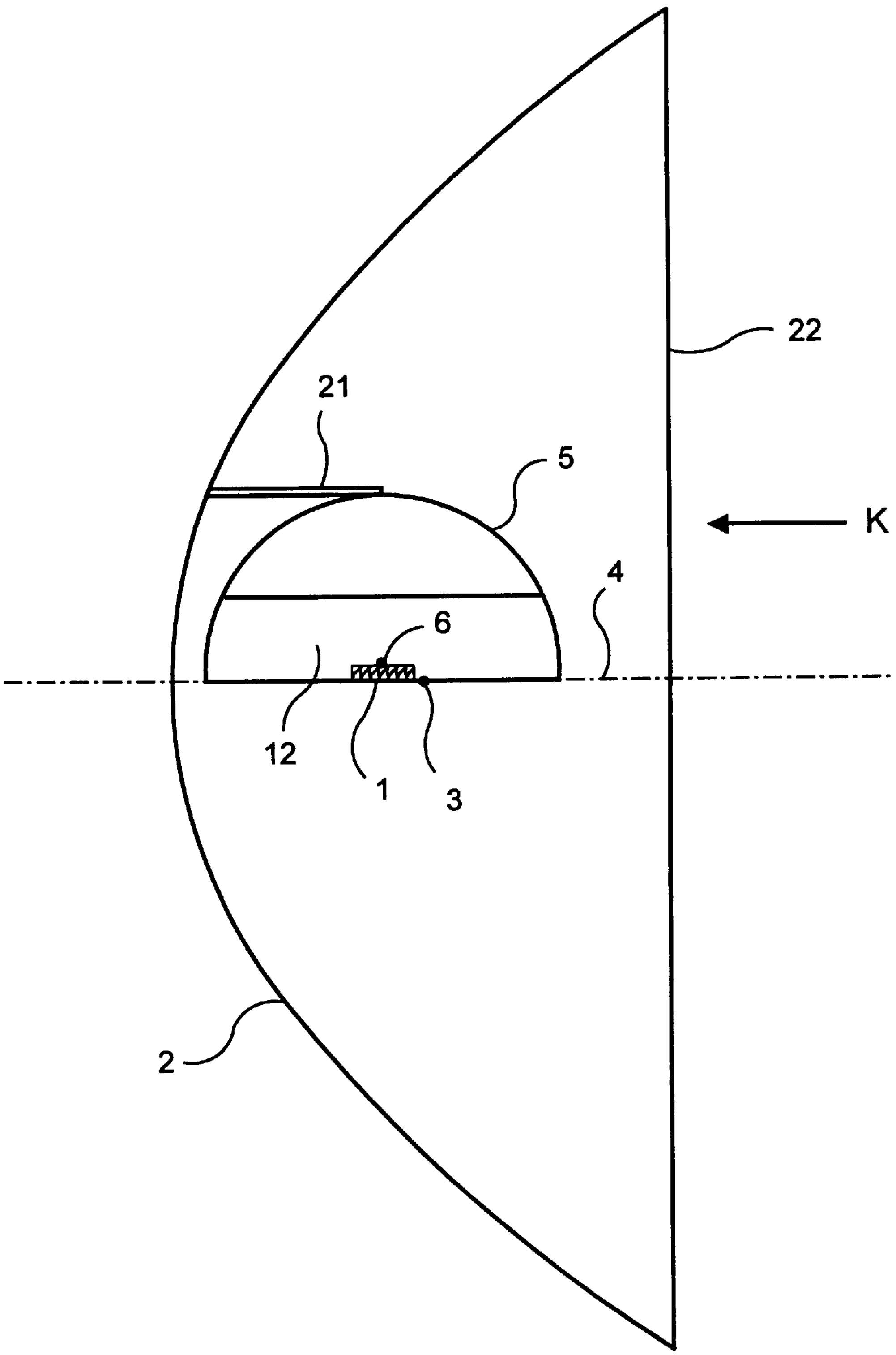
Figure 4:
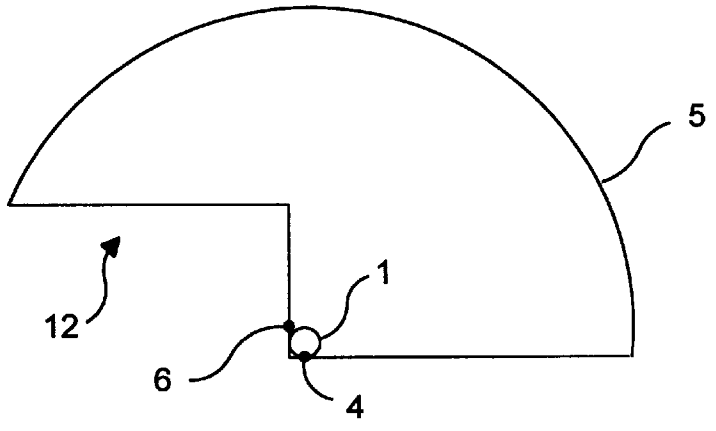
Figure 5:
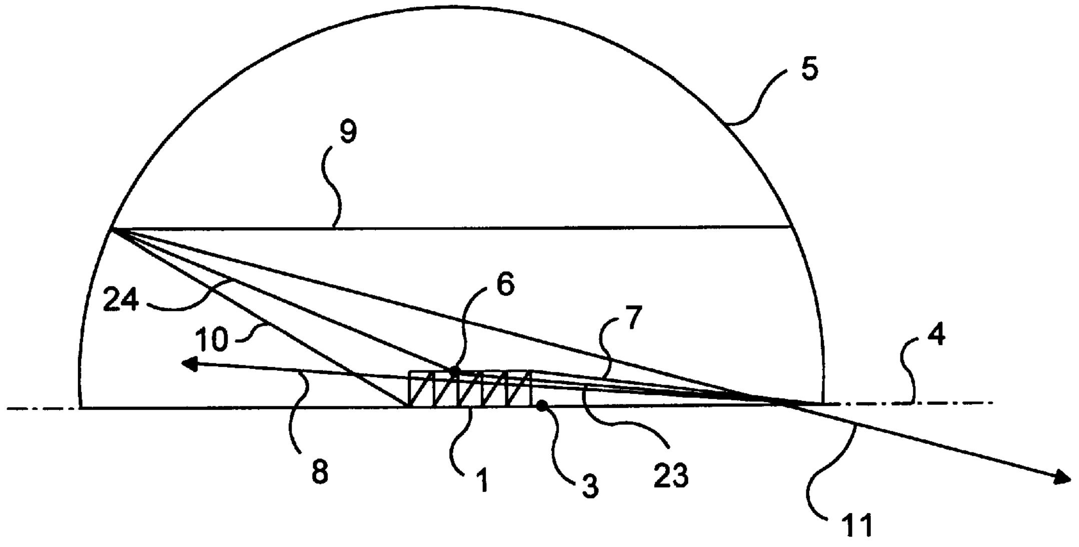

As shown in FIG. 3 and FIG. 4, a notched built-in reflector 5 is located above a reflector light axis 4 and mounted fixedly on a reflector 2 through an attaching support 21, a front lens (astigmatic glass) 22 is placed in front of the reflector 2 and a light source 1 is located behind a focus 3 of the reflector 2, above the light axis 4 and within the semispheric built-in reflector 5. A sphere center 6 is positioned on the intersection line of a horizontal plane on which the upper edge of the light source is located and a vertical plane on which the filament edge on the sphere's notch side 12 is located, the central axis of the light source and the light axis of the reflector being located on the same vertical plane. By the way of increasing the height of the sphere center of the semispheric built-in reflector relative to the center axis of the light source, or by way of moving forward the sphere center to shorten the distance from the sphere center to the front face of the light source, it is caused that the angle between the incident light, which is emitted from the light source to the lower edge of the semispheric built-in reflector in front of the sphere center and located above the normal, and the normal is equal to or smaller than the angle between the intersection line, which is made by the reflecting plane defined by this incident light and the normal with the horizontal plane on which the lower edge of the semispheric built-in reflector is located, and the normal which passes through the incidence point. Thus, when in the case of that: the focus of the rotational parabolic reflector is 28.5 mm; the radies of the semispheric built-in reflector equals to 20 mm; the length of the light source equals to 6.5 mm and the diameter 2 mm; the lower edge of the light source is located on the horizontal plane on which the light axis of the reflector is located, the distance between the front face of the light source and the reflector focus is 0.6 mm and the distance between the sphere center and the front face of the light source equals to 4 mm; the notch height of the semispheric built-in reflector is 10 mm and the projections of the front and back edges of the notch in the foreward and rearward directions, as shown in FIG. 5, it is caused that the reflective light 8, of the incident light 7 which is emitted from the light source to the lower edge of the semispheric built-in reflector in front of the focus and located above the normal 23, emits to the right upper portion of the reflector from above the light axis, through the notch of the semispheric bulit-in reflector, illuminating the upper space on the right side and the lower ground on the left side without becoming glaring light. Alternatively, as shown in FIG. 5, the reflective light 11 of the incident light 10 emitted from the light source to the notch upper edge 9 of the semispheric built-in reflector behind the sphere center, directly illuminates the space under the semispheric built-in reflector 24, is the normal between the incident light 10 and the reflective light 11.

Figure 6:
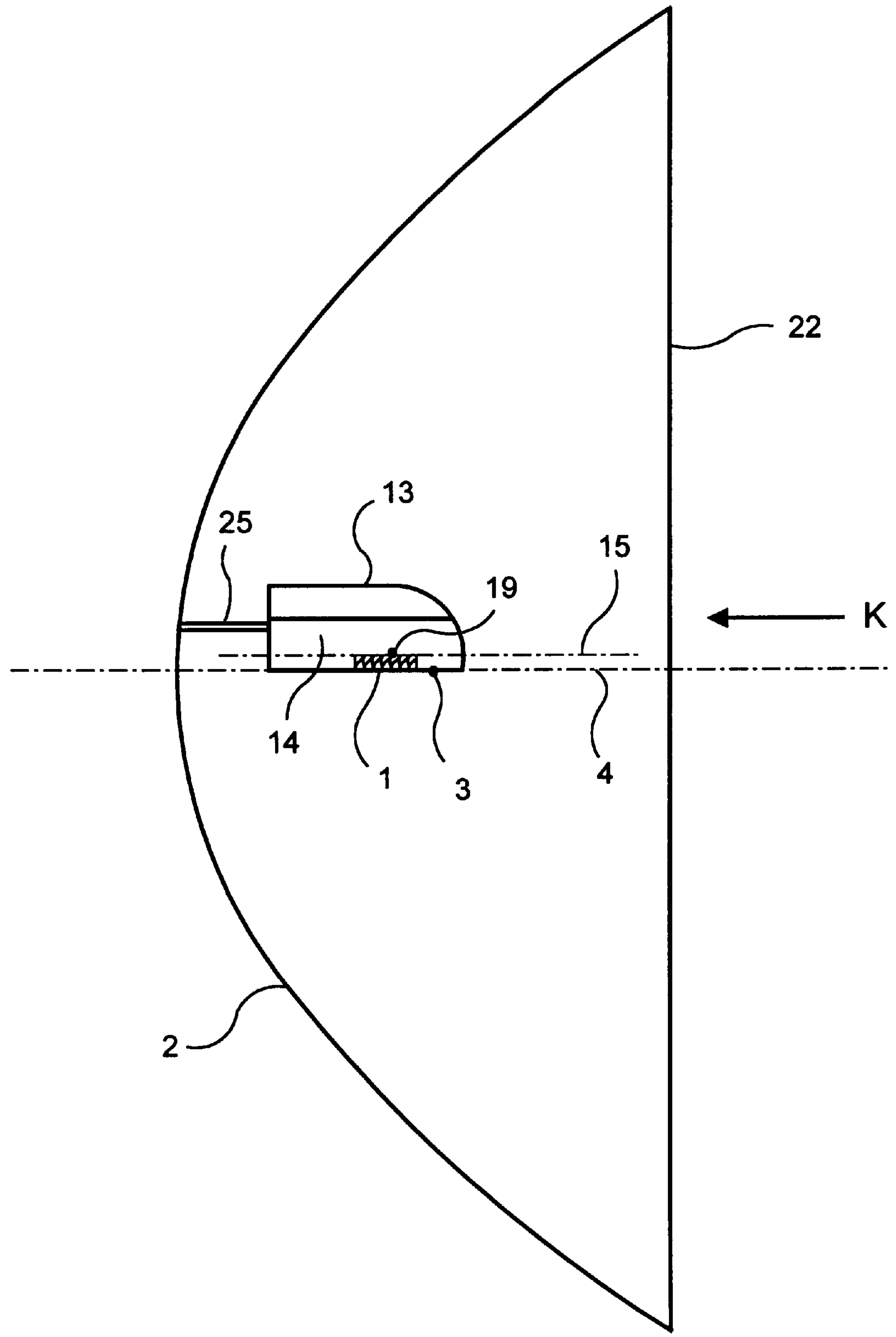
Figure 7:
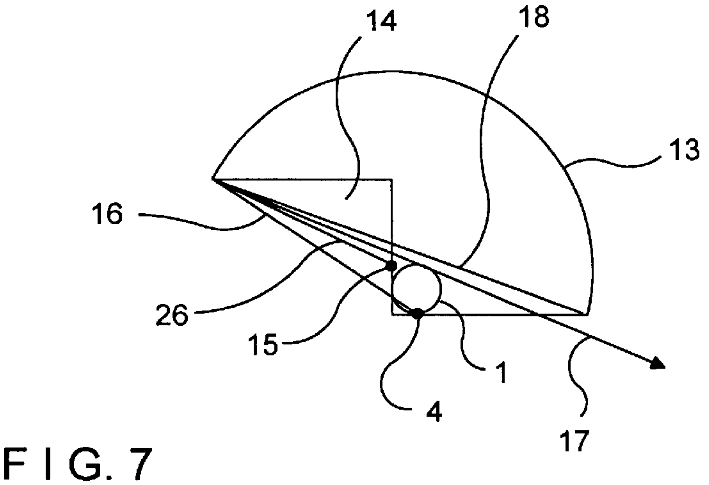

As shown in FIG. 6 and FIG. 7, a built-in reflector 13 is cylindrically shaped and mounted fixedly on a reflector 2 through an attaching support 25, it also has a notch 14 which yield E-type light pattern and its central axis 15 located at the upper edge of the light source and the light source edge on the noch side; the front face of the cylindrical built-in reflector is spherically shaped, its sphere center 19 is located on the contral axis 15 of the cylindrical surface with the sphere radius being the same as the cylinder radius. Thus, when in the case of that: the focus of the rotational parabolic reflector is 28.5 mm; the cylinder radius and the sphere radius are equal to 8 mm; the total length of the built-in reflector equals to 22 mm; the length of the light source equals to 6.5 mm and the diameter 2 mm; the lower edge of the light source is located on the horizontal plane on which the light axis of the reflector is located, the distance between the front face of the light source and the reflector focus is 0.6 mm and the distance between the sphere conter and the front face of the light source equals to 4 mm; the notch height of the built-in reflector is 6 mm and the projections of the front and back edges of the notch in the foreward and rearward directions, as shown in FIG. 6, it is caused that the reflective light, of the incident light which is emitted from the light source to the lower edge of the spheric reflective surface in front of the focus and located above the normal, emits to the right upper portion of the reflector from above the light axis, through the notch of the built-in reflector, illuminating the upper space on the right side and the lower ground on the left side without becoming glaring light.

Alternatively, as shown in FIG. 7, the angle between the incident light 16, emitted from the light source to the notch 14 upper edge of the built-in reflector, and the normal 26 is smaller than the angle between the line 18, which connects the intersection made by the reflecting plane, which is defined by this incident light and the normal, with the lower edge of the built-in reflector to the light incidence point on the built-in reflector and the normal 26, that makes the reflective light, emit to the upper notch edge from the light scource to illuminate the reflector located on the other side of the light axis from under the cylindrical built-in reflector. When the front face of the cylindrical built-in reflector is shaped to be planar and the face is plated to be black for preventing from yielding random reflective light, this built-in reflector can also be without any notch. But this would cause multiple reflection of the incident light in the built-in reflector, and reduce the efficiency of light utilization and also causing difficulties in achieving E-type light pattern.

Figure 8:
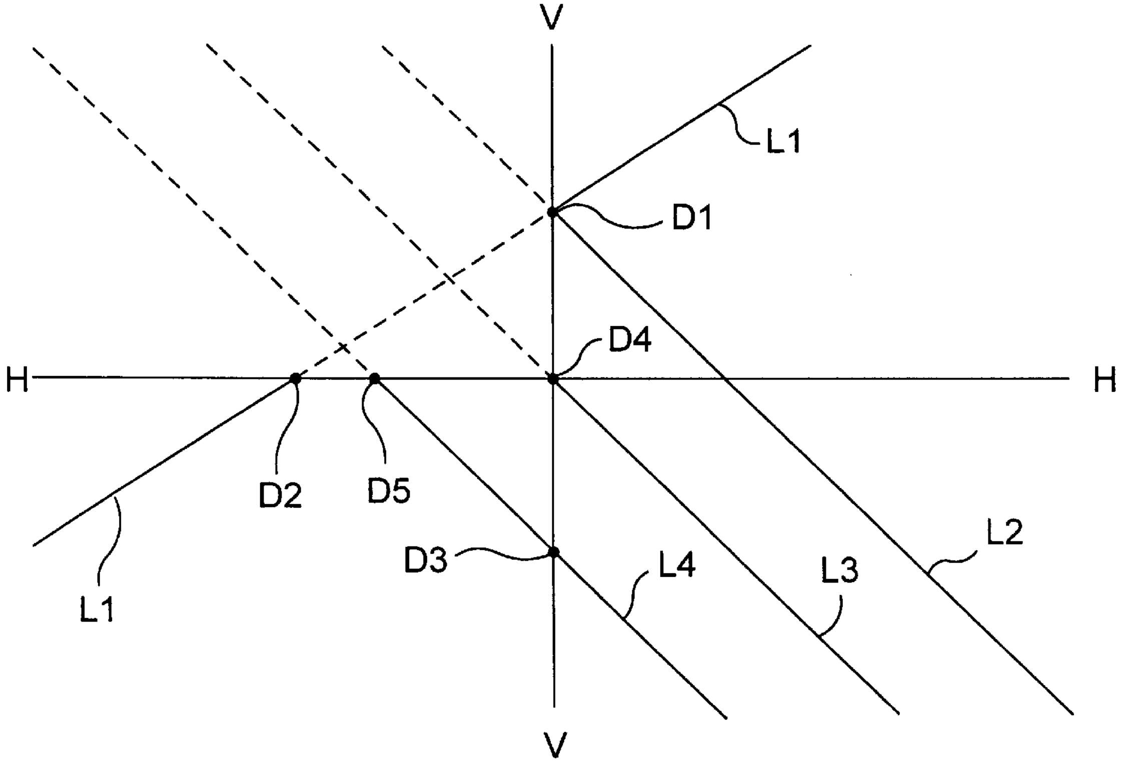

As shown in FIG. 8, when the intersection point $D_1$ formed by the reflecting planes $L_1$, $L_2$ and the V—V vertical line, which is on the light test plane and passes through the axis of headlight testing machine, is located above the H—H horizontal line, that is, when the intersection point formed by the incident light, which is emitted from the light source to the rotational parabolic reflector, and the vertical plane, which passes through the light axis of the reflector, is located under light axis of the reflector, the angle between the incident light, which is emitted from the light source to the left lower portion of the reflector with respect to the light axis, i.e., the incident light on the reflecting plane $L_1$, and the normal is larger than or equal to the angle between the two lines: one of them is the line that connects the intersection point D2, which is formed by the H—H horizontal line and the reflecting plane, and the light incidence point on the reflector; the other line is the normal; the angle between the incident light which is emitted from the light source to the right lower portion of the reflector with respect to the light axis, i.e., the incident light on the reflecting plane $L_2$, or the incident light which is emitted from the light source to the right upper portion of the reflector with respect to the light axis i.e., the incident light on the reflecting plane $L_1$, and the normal is larger than or equal to the angle between the two lines: one of them connects the intersection point D1 made by the V—V vertical line and the reflecting plane and the light incidence point on the reflector; the second line is the normal. The V—V vertical line is set at the limit leftward offset position on the test plane for not yielding any glaring light. Thus, even the reflective light, of the incident light emitted from the light source to the reflector, is higher than the H—H horizontal line, it can not illuminate the interval which is on the light test plane located on the other side of the V—V vertical plane and represents the eyes' position of a driver in an automobile running in his face, thus it can not become glaring light. When the intersection points $D_3$, $D_4$ of the reflecting planes $L_4$, $L_3$ and the V—V vertical line are located under the H—H horizontal line or are coincident herewith, that is, when the intersection point made by the incident light emitted from the light source to the rotational parabolic reflector with the vertical plane passing through the light axis of the reflector is located above the light axis of the reflector or is coincident with the light axis of the reflector, the angle between the incident light which is emitted from the light source to the right lower portion of the reflector with respect to the light axis of the reflector, i.e., the incidnet light on the reflecting planes $L_3$, $L_4$ passing throug the interval of glaring light and the normal is larger than or equal to the angle between the two lines: one of them connects the intersection points $D_4$, $D_5$, which are made by a specific horizontal line and the reflecting plane, and the light incidence point on the reflector; the other line is the normal. The specific H—H horizontal line is set at the limit hight on the test plane for not yielding any glaring light.

Figure 9:
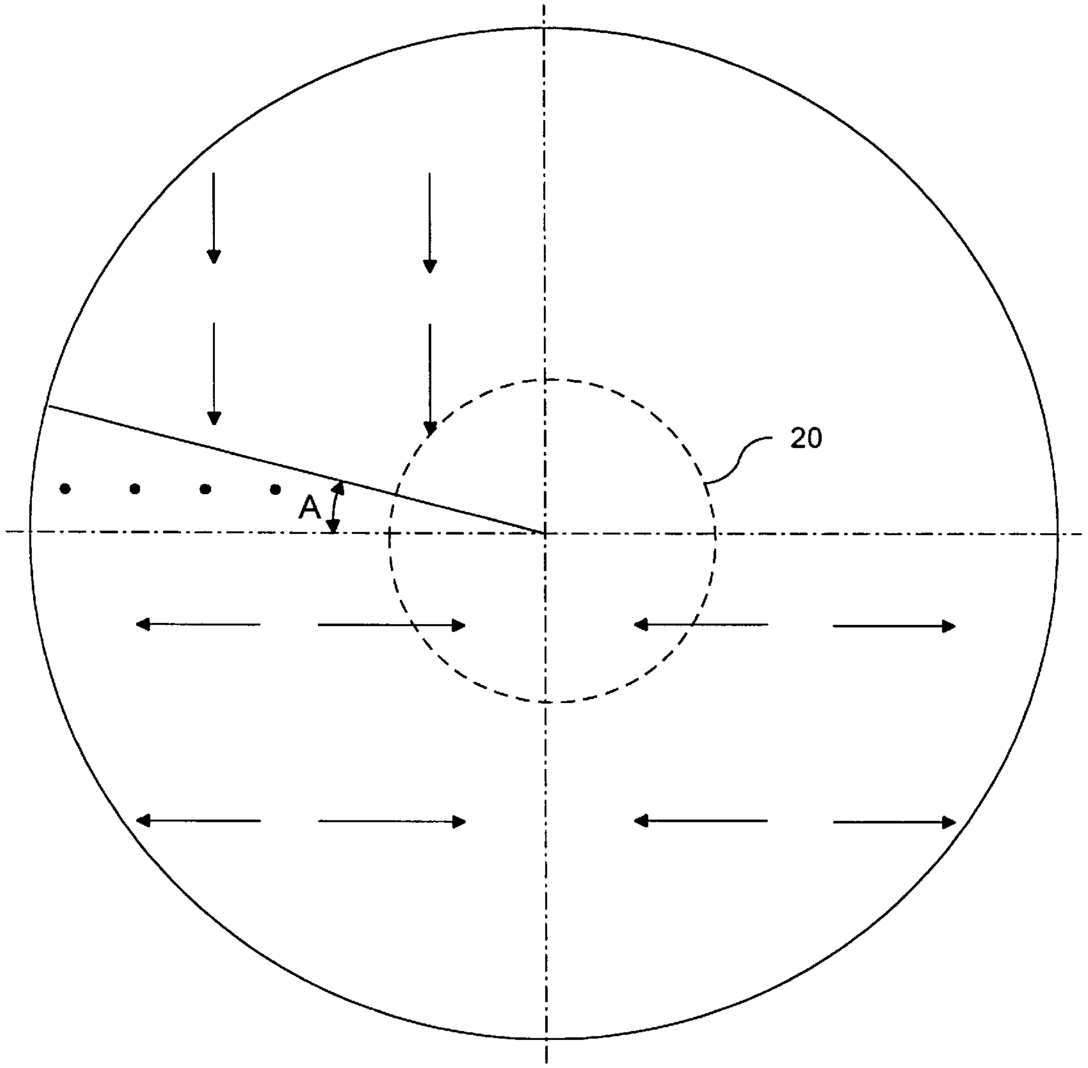

According to that shown in FIG. 9, the angle A of the E-type light pattern interval on the front lens is determined according to the required angle to the E-type light pattern from the light test standards, the optimum angle is 15 degrees. By refracting downward the light that is above the E-type light pattern with the refracting prism on the front lens to cause the light to be with a smaller angle than the required angle for the E-type light pattern while illuminating the light test plane, thus having the headlight emit the E-type light pattern which meets the test standards. The circle 20 shown in dotted line is the projection of the unplated dark area at the of top the reflector in the direction of the light axis of reflector, the projection radius being smaller than or equal to 28 mm.

Explanations for Designations Used in Accompanying Drawings

Explanations for Designations Used in Accompanying Drawings

| Designations | Components Designated |
|---|---|
| 1 | light source |
| 2 | reflector |
| 3 | focus of reflector |
| 4 | light axis of reflector |
| 5 | semispheric built-in reflector |
| 6 | sphere center of semispheric built-in reflector |
| 7 | incident light emitted from light source to front lower edge of semispheric built-in reflector |
| 8 | reflective light emitted from light source to front lower edge of semispheric built-in reflector |
| 9 | upper notch edge of semispheric built-in reflector |
| 10 | incident light emitted from light source to upper notch edge of semispheric built-in reflector |
| 11 | reflective light emitted from light source to upper notch edge of semisphric built-in reflector |
| 12 | notch of semispheric built-in reflector |
| 13 | cylindrical built-in reflector |
| 14 | notch of cylindrical built-in reflector |
| 15 | axis of cylindrical built-in reflector |
| 16 | incident light emitted from light source to upper notch edge of cylindrical built-in reflector |
| 17 | reflective light emitted from light source to upper notch edge of cylindrical built-in reflector |
| 18 | connecting line of light incident points on lower edge of built-in reflector and on upper notch edge |
| 19 | sphere center of semispheric top surface of cylindrical built-in reflector |
| 20 | unplated dark area at the top of rotational parabolic reflector |
| 21 | attaching support of semispheric built-in reflector |
| 22 | front lens |
| 23 | normal for incident light emitted from light source to front lower edge of semispheric built-in reflector |
| 24 | normal for incidnet light emitted from light source to upper notch edge of semispheric built-in reflector |
| 25 | attaching serpport of cylindrical built-in reflector |
| 26 | normal for incident light emitted from light source to upper natch edge of cylindrical built-in reflector |
| A | angle for E-type light pattern on front lens |
| H—H line | horizontal line on light test plane and passing through axis of headlight testing machine |
| V—V line | Vertical line on light test plane and passing through axis of headlight testing machine |
| $L_1$ | intersection of reflecting plane and light test plane |
| $L_2$ | intersection of reflecting plane and light test plane |
| $L_3$ | intersection of reflecting plane and light test plane |
| $L_4$ | intersection of reflecting plane and light test plane |
| $D_1$ | intersections of reflecting planes $L_1$, $L_2$ and V—V vertical line |
| $D_2$ | intersection of reflecting plane $L_1$ and H—H horizontal line |
| $D_3$ | intersection of reflecting plane $L_4$ and V—V vertical line |
| $D_4$ | intersection of reflecting plane $L_3$ and V—V vertical line |
| $D_5$ | intersection of reflecting plane $L_4$ and H—H horizontal line |

What is claimed is:

1. An antiglare remote light headlight for automobiles, comprising a light source (1), a reflector (2) having a focus (3) and a light axis (4), a front lens (22) and a notched built-in reflector (5); the notched built-in reflector (5) located above the light axis (4) of the reflector (2) and fixed on the reflector (2) through an attaching support (21); the light source (1) located within the notched built-in reflector (5) and behind the focus (3) of the reflector; the front lens (22) located in front of the reflector (2); wherein the light source (1) is spatially positioned such that a first angle between an incident light, emitted from the light source to a lower edge of a portion of the built-in reflector (5) in front of the reflector focus (3) and located above a normal, and the normal is smaller than a second angle between an intersection line, made by a reflecting plane defined by the incident light and the normal with a horizontal plane in which the lower edge of the built-in reflector (5) is located.

2. An antiglare remote light headlight for automobiles, comprising a light source (1), a reflector (2) having a focus (3) and a light axis (4), a front lens (22), and a built-in reflector (5); the built-in reflector (5), located above the light axis (4) of the reflector (2) and fixed on the reflector (2) through an attaching support (21); the light source (1) located within the built-in reflector (5) and behind the focus (3) of the reflector; the front lens (22) located in front of the reflector (2); wherein the light source (1) is spatially positioned such that:

(a) an intersection, made by an incident light emitted from the light source to the reflector (2) with a vertical plane passing through the light axis (4) of the reflector, is located under the light axis (4) of the reflector;

(b) a first angle between the incident light, emitted from the light source (1) to a left lower portion of the reflector with respect to the light axis (4) of the reflector, and a normal is generally larger than a second angle between a horizontal line, passing through a light incidence point on a reflecting plane, and the normal; and (c) a third angle between the incident light, emitted from the light source (1) to a right lower portion of the reflector or a right upper portion of the reflector with respect to the light axis of the reflector, and the normal is generally larger than a fourth angle between an intersection line, made by the vertical plane passing through the light incidence point on the reflecting plane and parallel to the light axis of the reflector with the reflecting plane, and the normal.

3. An antiglare remote light headlight for automobiles, comprising a light source (1), a reflector (2) having a focus (3) and a light axis (4), a front lens (22) and a built-in reflector (5); the built-in reflector (5), located above the light axis (4) of the reflector (2) and fixed on the reflector (2) through an attaching support (21); the light source (1) located within the built-in reflector (5) and behind the focus (3) of the reflector; the front lens (22) located in front of the reflector (2); wherein the light source (1) is spatially positioned such that:

(a) an intersection point, made by an incident light emitted from the light source to the reflector (2) with a vertical plane passing through the light axis (4) of the reflector, is located above or coincident with the light axis (4) of the reflector; and (b) a first angle between the incident light, emitted from the light source to a right lower portion of the reflector with respect to the light axis (4) of the reflector, and a normal is generally larger than a second angle between a horizontal line, passing through a light incidence point on a reflecting plane, and the normal.

4. An antiglare remote light headlight for automobiles, comprising a light source (1), a reflector (2) having a focus (3) and a light axis (4), a front lens (22) and a built-in reflector (5); the built-in reflector (5), located above the light axis (4) of the reflector (2), and mounted fixedly on the reflector (2) through an attaching support (21); the light source (1) located within the built-in reflector (5) and behind the focus (3) of the reflector; the front lens (22) located in front of the reflector (2); wherein the light source (1) is spatially positioned such that:

(a) an intersection point, made by an incident light emitted from the light source to the reflector (2) with a vertical plane passing through the light axis (4) of the reflector, is located under the light axis (4) of the reflector;

(b) a first angle between the incident light, emitted from the light source to a right lower portion of the reflector with respect to the light axis (4) of the reflector, and a normal is generally larger than a second angle between a horizontal line, passing through a light incidence point on a reflecting plane, and the normal; and (c) a third angle between the incident light, emitted from the light source to a left lower portion of the reflector or a left upper portion of the reflector with respect to the light axis of the reflector, and the normal is generally larger than a fourth angle between an intersection line, made by the vertical plane passing through the light incident point on the reflecting plane and parallel to the light axis of the reflector with the reflecting plane, and the normal.

5. An antiglare remote light headlight for automobiles, comprising a light source (1), a reflector (2) having a focus (3) and a light axis (4), a front lens (22) and a notched built-in reflector (5), the notched built-in reflector (5), located above the light axis (4) of the reflector (2), and fixed on the reflector (2) through an attaching support (21); the light source (1) located within the notched built-in reflector (5) and behind the focus (3) of the reflector; the front lens (22) located in front of the reflector (2); wherein the light source is spatially positioned such that:

(a) an intersection point, made by an incident light, emitted from the light source to the reflector (2) with a vertical plane passing through the light axis (4) of the reflector, is located above or coincident with the light axis of the reflector; and (b) a first angle between the incident light, emitted from the light source to a left lower portion of the reflector with respect to the light axis (4) of the a reflector, and a normal is generally larger than a second angle between a horizontal line, passing through a light incidence point on a reflecting plane, and the normal.

6. An antiglare remote light headlight for automobiles, comprising a light source (1), a reflector (2) having a focus (3) and a light axis (4), a front lens (22) and a notched built-in reflector (5); the notched built-in reflector (5), located above the light axis (4) of the reflector (2), and fixed on the reflector (2) through an attaching support (21); the light source (1) located within the notched built-in reflector (5) and behind the focus (3) of the reflector; the front lens (22) located in front of the reflector (2); wherein the front lens includes a prism which refracts a light emitted out of the notch of the built-in reflector and beyond a standard angle for an E-type light pattern to an underside of an edge line of the standard E-type light pattern.

7. The headlight according to claim 1 or 2 or 3 or 4 or 5 or 6, wherein the built-in reflector is cylindrical in a surface shape and has a front face.

8. The headlight according to claim 7, wherein the front face of the cylindrical built-in reflector is spheric in the surface shape.

9. An antiglare remote light headlight for automobiles, comprising a light source (1), a reflector (2) having a focus (3) and a light axis (4), a front lens (22) and a light bulb having a glass shell with a curved surface, part of the curved surface plated with a notched reflecting layer forming a notched built-in reflector; the notched built-in reflector located above the light axis (4) of the reflector (2), the bulb mounted on the reflector (2); the light source (1) is located within the notched built-in reflector and behind the focus (3) of the reflector; the front lens (22) located in front of the reflector (2); wherein the light source (1) is spatially positioned such that a first angle between an incident light, emitted from the light source to a lower edge of a portion of the built-in reflector in front of the focus (3) of the reflector and located above a normal, and the normal is smaller than a second angle between an intersection line, made by a reflecting plane defined by this incident light and the normal with a horizontal plane in which the lower edge of the built-in reflector is located, and the normal.

10. An antiglare remote light headlight for automobiles, comprising a light source (1), a reflector (2) having a focus (3) and a light axis (4), a front lens (22) and a light bulb having a glass shell with a curved surface, a part of the curved surface plated with a reflecting layer forming a built-in reflector; the built-in reflector located above the light axis (4) of the reflector (2), the bulb mounted on the reflector (2); the light source (1) located within the built-in reflector and behind the focus (3) of the reflector; the front lens (22) located in front of the reflector (2); wherein the light source (1) is spatially positioned such that:

(a) an intersection point, made by an incident light emitted from the light source to the reflector (2) with a vertical plane passing through the light axis (4) of the reflector, is located under the light axis (4) of the reflector;

(b) a first angle between the incident light, emitted from the light source to a left lower portion of the reflector with respect to the light axis of the reflector, and a normal is generally larger than a second angle between a horizontal line passing through a light incidence point on a reflecting plane, and the normal; and (c) a third angle between the incident light, emitted from the light source to a right lower portion of the reflector or a right upper portion of the reflector with respect to the light axis of the reflector, and the normal, is generally larger than a fourth angle between an intersection line, made by a vertical plane passing through the light incidence point on the reflecting plane and parallel to the light axis of the reflector with the reflecting plane, and the normal.

11. An antiglare remote light headlight for automobiles, comprising a light source (1), a reflector (2) having a focus (3) and a light axis (4), a front lens (22) and a light bulb having a glass shell with a curved surface, a part of the curved surface plated with a reflecting layer forming a built-in reflector; the built-in reflector located above the light axis (4) of the reflector (2), the bulb mounted on the reflector (2); the light source (1) located within the built-in reflector and behind the focus (3) of the reflector; the front lens (22) located in front of the reflector (2); wherein the light source (1) is spatially positioned such that:

(a) an intersection point, made by an incident light emitted from the light source to the reflector (2) with a vertical plane passing through the light axis (4), is located above or coincident with the light axis (4) of the reflector; and (b) a first angle between the incident light, emitted from the light source to a right lower portion of the reflector with respect to the light axis (4) of the reflector, and a normal is generally larger than a second angle between a horizontal line, passing through a light incidence point on a reflecting plane, and the normal.

12. An antiglare remote light headlight for automobiles, comprising a light source (1), a reflector (2) having a focus (3) and a light axis (4), a front lens (22) and a light bulb having a glass shell with a curved surface, a part of the curved surface plated with a reflecting layer forming a built-in reflector; the built-in reflector located above the light axis (4) of the reflector (2), the bulb mounted on the reflector (2); the light source (1) located within the built-in reflector and behind the focus (3) of the reflector; the-front lens (22) located in front of the reflector (2); wherein the light source is spatially positioned such that:

(a) an intersection point, made by an incident light emitted from the light source to the reflector (2) with a vertical plane passing through the light axis (4) of the reflector, is located under the light axis (4) of the reflector;

(b) a first angle between an incident light, emitted from the light source to a right lower portion of the reflector with respect to the light axis (4) of the reflector, and a normal is generally larger than a second angle between a horizontal line, passing through a light incidence point on a reflecting plane, and the normal; and (c) a third angle between the incident light, emitted from the light source to a left lower portion of the reflector or a left upper portion of the reflector with respect to the light axis of the reflector, and the normal is generally larger than a fourth angle between an intersection line, made by the vertical plane passing through the light incidence point on the reflecting plane and parallel to the light axis of the reflector with the reflecting plane, and the normal.

13. An antiglare remote light headlight for automobiles, comprising a light source (1), a reflector (2) having a focus (3) and a light axis (4), a front lens (22) and a light bulb having a glass shell with a curved surface, a part of the curved surface plated with a reflecting layer forming a built-in reflector; the built-in reflector located above the light axis of (4) the reflector (2), the bulb mounted on the reflector (2); the light source (1) located within the built-in reflector and behind the focus (3) of the reflector; the front lens (22) located in front of the reflector (2); wherein the light source is spatially located such that:

(a) an intersection point, made by an incident light emitted from the light source to the reflector (2) with a vertical plane passing through the light axis (4) of the reflector is located above or coincident with the light axis (4) of the reflector; and (b) a first angle between the incident light, emitted from the light source to a left lower portion of the reflector with respect to the light axis (4) of the reflector, and a normal is generally larger than a second angle between a horizontal line, passing through a light incidence point on a reflecting plane, and the normal.

14. An antiglare remote light headlight for automobiles, comprising a light source (1), a reflector (2) having a focus (3) and a light axis (4), a front lens (22) and a light bulb having a glass shell with a curved surface, a part of the curved surface plated with a notched reflecting a notched built-in reflector; the notched built-in reflector located above the light axis (4) of the reflector (2), the bulb mounted on the reflector (2); the light source (1) located within the built-in reflector and behind the focus (3) of the reflector; the front lens (22) located in front of the reflector (2); wherein the front lens includes a prism which refracts a light emitted out of the notch of the built-in reflector and beyond an angle for a standard E-type light pattern to an underside of an edge line of the standard E-type light pattern.

15. The headlight according to claim 9 or 10 or 11 or 12 or 13 or 14, wherein the curved surface of the glass shell of the light bulb is spheric or cylindrical.

16. The headlight according to claim 15, wherein a front face of the cylindrical glass shell of the light bulb is spheric in the surface shape.

17. The headlight according to claim 1 or 9, wherein an upper notch edge of the built-in reflector is disposed at an elevational position such that a third angle between the incident light, emitted from the light source to the upper notch edge, and the normal is smaller than a fourth angle between a straight line, connecting an intersection made by the a reflecting plane defined by this incident light and the normal with the lower edge of the built-in reflector to a light incidence point on the reflecting plane, and the normal.

18. The headlight according to claim 1, 2, 3, 4, 5, 6, 9, 10, 11, 12, 13 or 14, wherein the reflector has a rotational parabolic surface shape, and a dark top area that is without a plated reflecting layer.

19. The headlight according to claim 6 or 14, wherein an upper notch edge of the built-in reflector is disposed at an elevational position such that first angle between an incident light, emitted from the light source to the upper notch edge, and a normal is smaller than a second angle between a straight line, connecting an intersection made by a reflecting plane defined by this incident light and the normal with lower edge of the built-in reflector to a light incidence point on the reflecting plane, and the normal.

* * * * *